US012591277B2

(12) United States Patent (10) Patent No.: US 12,591,277 B2
Hong et al. (45) Date of Patent: Mar. 31, 2026

(54) HINGE DEVICE OF PORTABLE TERMINAL WITH FOLDABLE STRUCTURE

(71) Applicant: FINE M-TEC CO., LTD., Anyang-si (KR)

(72) Inventors: Sung Chun Hong, Seoul (KR); Hyun Taek Jung, Seoul (KR); Chang Soo Kim, Incheon (KR)

(73) Assignee: FINE M-TEC CO., LTD., Anyang-si (KR)

( * ) Notice: Subject to any disclaimer, the term of this patent is extended or adjusted under 35 U.S.C. 154(b) by 399 days.

(21) Appl. No.: 18/250,611

(22) PCT Filed: Dec. 2, 2021

(86) PCT No.: PCT/KR2021/018131
§ 371 (c)(1),
(2) Date: Apr. 26, 2023

(87) PCT Pub. No.: WO2022/119353
PCT Pub. Date: Jun. 9, 2022

(65) Prior Publication Data
US 2023/0409090 A1 Dec. 21, 2023

(30) Foreign Application Priority Data

Dec. 3, 2020 (KR) ........................ 10-2020-0167278

(51) Int. Cl.
*G06F 1/16* (2006.01)
*H04M 1/02* (2006.01)
(52) U.S. Cl.
CPC .......... *G06F 1/1681* (2013.01); *G06F 1/1616* (2013.01); *G06F 1/1652* (2013.01); *H04M 1/0216* (2013.01); *H04M 1/0268* (2013.01)

(58) Field of Classification Search
CPC .... G06F 1/1616; G06F 1/1681; G06F 1/1652; H04M 1/0216; H04M 1/0268; H05K 5/00
See application file for complete search history.

(56) References Cited

U.S. PATENT DOCUMENTS 9,274,566 B1 3/2016 Horng
10,520,988 B2 * 12/2019 Hsu ........................ G06F 1/1618
(Continued)

FOREIGN PATENT DOCUMENTS

KR 10-2011-0002729 A 1/2011
KR 10-2012-0129234 A 11/2012
(Continued)

*Primary Examiner* — Anthony Q Edwards
*Assistant Examiner* — Rashen E Morrison
(74) *Attorney, Agent, or Firm* — NKL LAW; Jae Youn Kim

(57) ABSTRACT
A hinge device for a portable terminal having a foldable structure according to the present invention comprises: a housing positioned between one end of a first body and one end a second body; a first hinge blade and a second hinge blade which are fixed to the first body and the second body, respectively, and are rotatably supported by the housing, so as to rotate at a predetermined angle between an 'unfolded position' in which the first body and the second body are placed on the same horizontal line and a 'folded position' in which the first body and the second body face each other and come into contact with each other; and a slide member that interlocks the first hinge blade and the second hinge blade such that the first hinge blade and the second hinge blade move relative to each other, wherein the first hinge blade and the second hinge blade have first inclined guide groove and second inclined guide groove formed on the undersides thereof, and correspondingly thereto, the slide member has first inclined guide protrusion and second inclined guide protrusion formed on tops thereof, the slide member being disposed in the housing and reciprocating by a predeter-
(Continued)

mined distance in a direction of a hinge axial line, and the first inclined guide groove and the second inclined guide groove being formed inclinedly in a direction crossing to each other with respect to the moving direction of the corresponding slide member.

18 Claims, 18 Drawing Sheets

(56)                    References Cited

U.S. PATENT DOCUMENTS

| | | | |
|---|---|---|---|
| 11,625,073 B2 * | 4/2023 | Shim ..................... | G06F 1/1652 |
| | | | 361/679.28 |
| 2022/0264756 A1 * | 8/2022 | Oh ........................ | G06F 1/1618 |
| 2025/0085745 A1 * | 3/2025 | Zheng ................ | H04M 1/0237 |

FOREIGN PATENT DOCUMENTS

| | | |
|---|---|---|
| KR | 10-2016-0121350 A | 10/2016 |
| KR | 10-2019-0097898 A | 8/2019 |
| KR | 10-2019-0124110 A | 11/2019 |

* cited by examiner

55(56)      53(54)

55(56)     53(54)

HINGE DEVICE OF PORTABLE TERMINAL WITH FOLDABLE STRUCTURE

TECHNICAL FIELD

The present invention relates to a hinge device for a portable terminal with a foldable structure, and more specifically, to a hinge device for a portable terminal with a foldable structure that is configured to be disposed on the portable terminal to which a flexible display is applied, thereby having an improvement in the foldable structure in which the flexible display is stably folded and unfolded.

BACKGROUND ART

Portable terminals are devices that are carried with users, while each having a battery and a display part to thus output information to the display part using the power supplied from the battery.

The portable terminal includes a device for recording and playing videos and a device for displaying graphic user interface (GUI), and examples of the portable terminals include laptops, smartphones, glasses and watches with which screen information is displayed, game machines, and the like.

As the functions of the portable terminals become diverse, further, the portable terminals are functioned as multimedia players having multi-functions such as picture or video taking, music or video file reproducing, game playing, broadcasting receiving, and the like.

To support and increase the functions of the portable terminals, improvements in structures and/or software of the portable terminals may be required.

Further, the portable terminals are developed with various designs, and so as to satisfy the needs of users for newer and more different designs, endeavors for developing the portable terminals to new shapes have been made.

In this case, the new shapes include structural changes and improvements in the portable terminals so as to allow the portable terminals to be more conveniently used by the users.

As one of the structural changes and improvements, a portable terminal whose at least a portion of the display part is bendable or foldable is in the limelight.

However, a complicated configuration is needed in supplying power or external force required to allow the portable terminal to be bent or folded, thereby disadvantageously making an outer appearance of the portable terminal not simple and causing the thickness of the portable terminal to increase.

When a flexible display panel is folded, further, it is changed in length, and accordingly, a hinge device used for a conventional folder portable terminal cannot be used.

Besides, most of conventional hinge devices applied to the flexible display panel are configured to have an interlocking structure in which two bodies move relative to each other, using gears that simply interlock with each other in rotating directions of the bodies (See Korean Patent Application Laid-open No. 10-2019-0124110). However, the interlocking structure may be lowered in durability, generate vibrations or noise, have complicated manufacturing processes, and increase component costs.

Therefore, there is an urgent need for developing a hinge device for a portable terminal that has a new and efficient folding structure capable of equally folding both ends of a flexible display panel to the same angle to each other to thus handle changes in length of the flexible display panel.

DISCLOSURE

Technical Problem

Accordingly, the present invention has been made in view of the above-mentioned problems occurring in the related art, and it is an object of the present invention to provide a hinge device for a portable terminal with a foldable structure that is capable of improving durability, reducing vibrations or noise, being simple in a manufacturing process, and lowering component costs.

Technical Solution

To accomplish the above-mentioned objects, according to the present invention, a hinge device for a portable terminal with a foldable structure may include: housing positioned between one end of a first body and one end of a second body; first hinge blade and second hinge blade fixed to the first body and the second body, respectively and supported by the housing to rotate at a predetermined angle between an 'unfolded position' in which the first body and the second body are placed on the same horizontal line and a 'folded position' in which the first body and the second body face each other and come into contact with each other; and slide member for interlocking the first hinge blades and the second hinge blades with each other so that the first hinge blade and the second hinge blade move relative to each other, wherein the first hinge blade and the second hinge blade have first inclined guide groove and second inclined guide groove formed on the undersides thereof, and correspondingly thereto, the slide member has first inclined guide protrusion and second inclined guide protrusion formed on tops thereof, the slide member being disposed in the housing and reciprocating by a predetermined distance in a direction of a hinge axial line.

According to the present invention, further, each first inclined guide groove and each second inclined guide groove may be formed inclinedly in a direction crossing each other with respect to the moving direction of the corresponding slide member.

According to the present invention, moreover, portions on which the first inclined guide groove and the second inclined guide groove are formed may be curvedly formed toward rotation directions.

According to the present invention, further, each housing may have a rectangular slide slot formed thereon in the moving direction of the corresponding slide member, and the corresponding slide member may have a slide protrusion protruding from the underside thereof and thus fittedly guided along the slide slot.

According to the present invention, besides, the first inclined guide protrusions and the second inclined guide protrusions may become reduced in width toward tops thereof.

According to the present invention, additionally, the first inclined guide protrusions and the second inclined guide protrusions may be rectangular in lengthwise directions of the first inclined guide grooves and the second inclined guide grooves.

According to the present invention, further, the first inclined guide protrusions and the second inclined guide protrusions may be hemispherical.

According to the present invention, moreover, a pair of semi-circular protrusions may be formed on the inner wall surfaces of both sides of the housing, and semi-circular grooves may be formed on the first hinge blade and second hinge blade, respectively, to be rotated by fitting the semi-circular protrusions thereto.

According to the present invention, further, each pair of semi-circular protrusions may be spaced apart from each other by a predetermined distance to allow a predetermined curvature radius formed on a folding portion of a flexible display panel to be accommodated in the predetermined distance at the 'folding position'.

According to the present invention, the hinge device may further include tension mechanism comprising a tension fixing member having a first guide shaft and a second guide shaft disposed thereon in the direction of the hinge axial line, a first tension blade and a second tension blade fitted to the first guide shaft and the second guide shaft, rotating supportedly thereagainst, and movable to axial directions, tension operating members movably fitted to the first guide shaft and the second guide shaft in the axial directions, and springs for applying elastic forces to the tension operating members.

According to the present invention, further, a plurality of inclined protrusions may be formed on the tension operating members in circumferential direction around the first guide shaft and the second guide shaft, and another plurality of inclined protrusions that can be fitted corresponding to the inclined protrusions may be formed on the first tension blade and the second tension blade.

According to the present invention, further, the tension mechanism may have tension guide protrusions protruding from the first tension blade and the second tension blade, respectively, and the tension guide protrusions are inserted into and guided in tension guide holes formed on one side of the first hinge blade and second hinge blade.

According to the present invention, moreover, the tension guide holes may be rectangular.

According to the present invention, the hinge device may further include springs elastically installed at the interlocking portions between the first and the second hinge blade and the first and the second tension blade, and located furthest from the rotation axis of the first tension blade and the second tension blade.

According to the present invention, the hinge device may further include ascending and descending plate disposed in the housing and positioned in the folding space, so that ascending and descending plate operates interlockingly by means of pressurization upon the rotations of the first hinge blade and the second hinge blade and thus moves between an ascending position separated from the housing to connect the first body and the second body to each other on a horizontal line at the unfolding position and a descending position close to the housing to form the folding space between the first hinge blade and the second hinge blade.

According to the present invention, moreover, the ascending and descending plate may interlock through pressurizing means, and the pressurizing means may have first pressurizing protrusion and second pressurizing protrusion adapted to pressurize the ascending and descending plate thereagainst to allow the ascending and descending plate to move to the ascending position and the descending position.

According to the present invention, besides, the first pressurizing protrusion and the second pressurizing protrusion may be formed in circumferential directions on rotating portions around the first guide shaft and the second guide shaft.

According to the present invention, further, the pressurizing means may further include an elastic member adapted to apply an elastic force so that the ascending and descending plate is at the descending position.

According to the present invention, moreover, the elastic member may be a conical compression coil spring.

Advantageous Effects

According to the present invention, the hinge structure for interlocking the bodies with each other has the slide member linearly moving in the directions of the hinge axial lines of the bodies upon the folding operation, thereby minimizing the load and gap occurring upon the folding operation to reduce vibrations and noise generated and being simplified in the interlocking structure to achieve the improvement of durability, the reduction of component costs, and the simplification of a manufacturing process.

According to the present invention, further, the ascending and descending plates move to the descending positions at the folding position of the bodies to form the folding space in which the predetermined curvature radius formed in the folding portion of the flexible display panel is accommodated, and the ascending and descending plates move to the ascending positions at the unfolding position of the bodies to allow the folding portion of the flexible display panel to be consistently kept to the horizontal state.

---

<Explanations of Reference Numerals>

| | |
|---|---|
| 11, 12: First and second bodies | 13: Flexible display panel |
| 14: Hinge device | 21, 22: First and second hinge blades |
| 31: Housing | 41: Slide member |
| 43a, 43b: First and second inclined guide grooves | |
| 44a, 44b: First and second inclined guide protrusions | |
| 50: Tension mechanism | 55, 56: First and second tension blades |
| 70: Ascending and descending plate | 73, 74: First and second pressurizing protrusions |
| 75: Elastic member | |

---

BEST MODE FOR INVENTION

Hereinafter, the present invention will now be described in detail with reference to the attached drawings.

Figure 1:
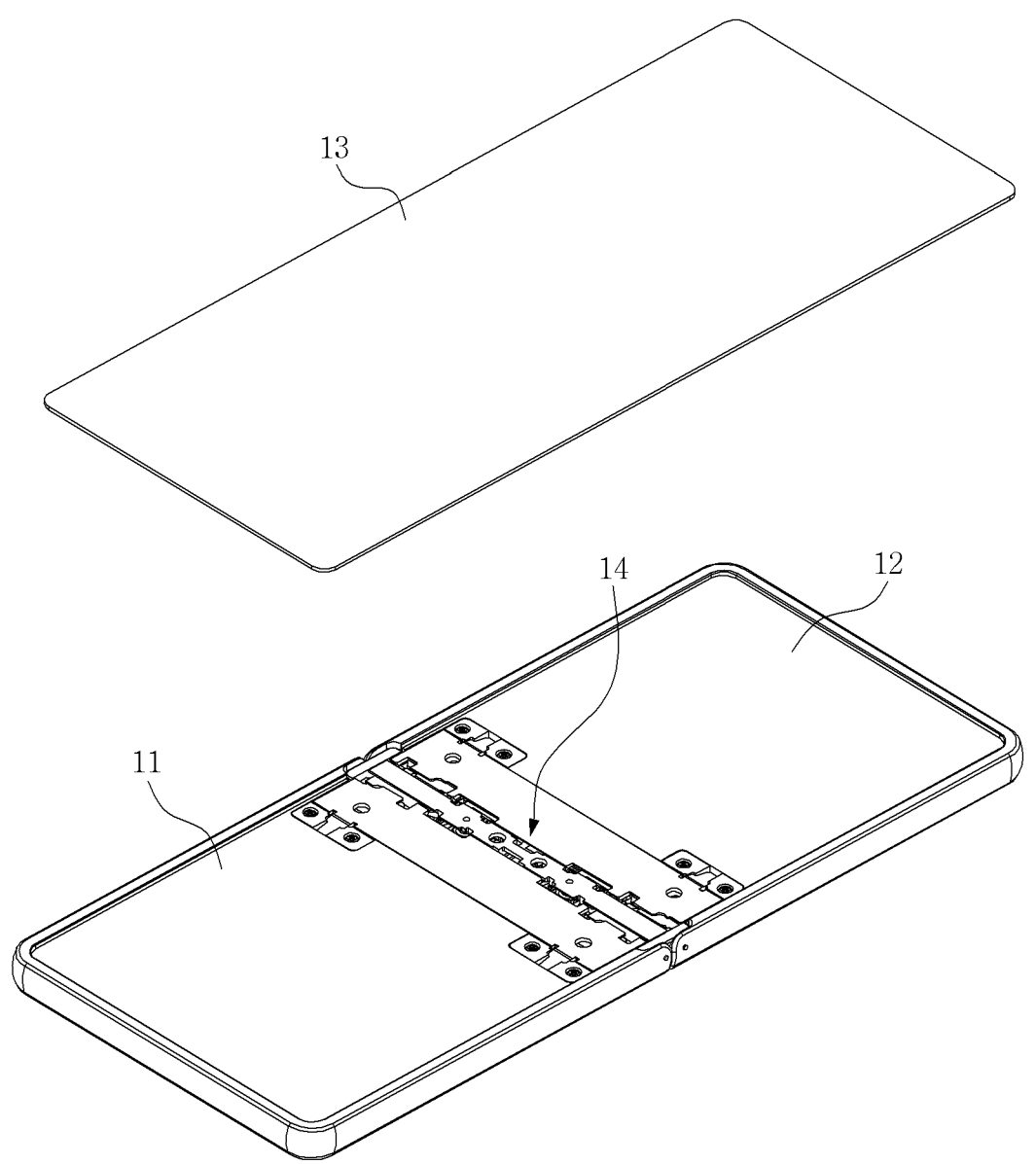
FIG. 1 is a perspective view showing a state where a flexible display panel is separated from a first body and a second body at a position where a portable terminal is unfolded according to the present invention.

FIG. 1 is a perspective view showing a state where a flexible display panel 13 is separated from first and second bodies 11 and 12 at a position where a portable terminal is unfolded according to an embodiment of the present invention, and in this case, a hinge device 14 is connected between one end of a folding portion of the first body 11 and one end of a folding portion of the second body 12 facing the folding portion of the first body 11.

The flexible display panel 13 has a given size so that it can cover the entire area of the first and second bodies 11 and 12 including the hinge device 14, and further, the flexible display panel 13 is fixed to the entire inner surfaces of the first and second bodies 11 and 12 excepting the hinge device 14 through attaching means such as an adhesive and the like.

Figure 2:
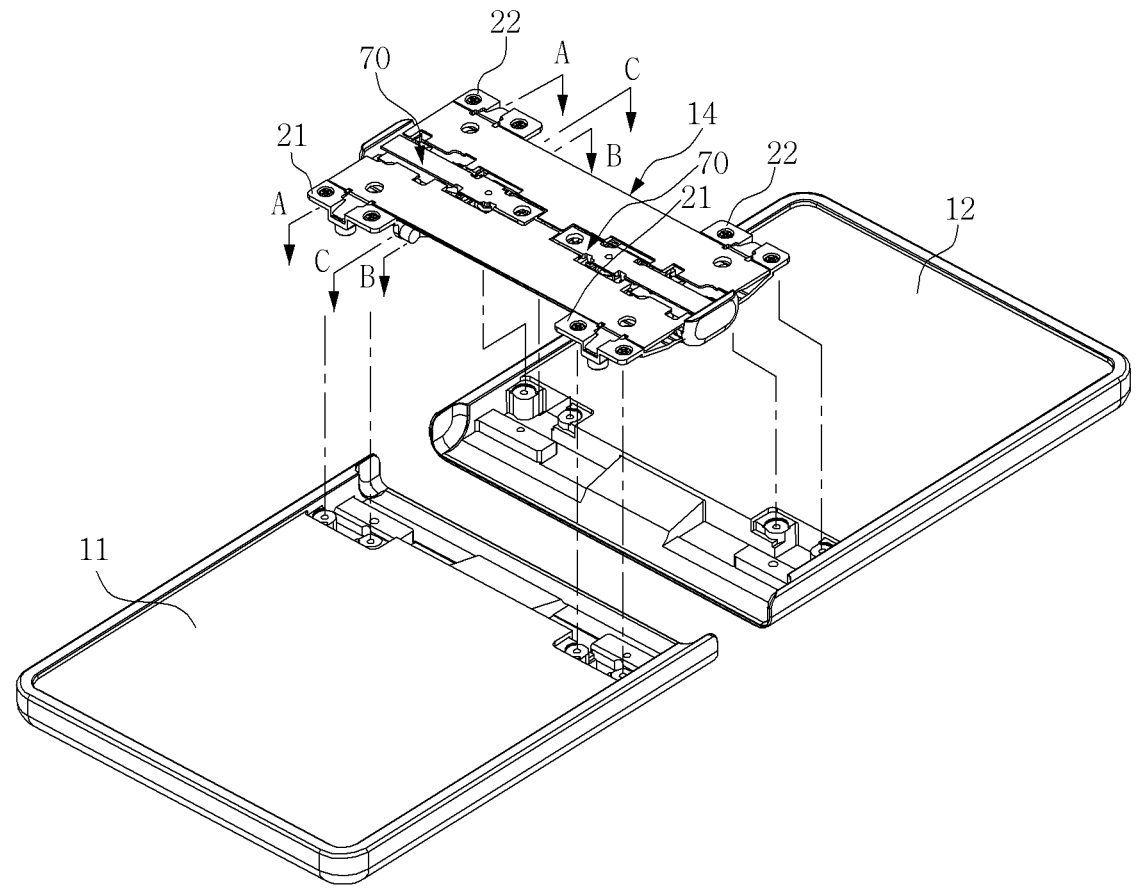
FIG. 2 is a perspective view showing a coupling relation of a hinge device according to the present invention to the first and second bodies of FIG. 1.

FIG. 2 is a perspective view showing a coupling relation of the hinge device 14 according to the present invention to the first and second bodies 11 and 12, and in this case, the hinge device 14 includes first hinge blades 21 and second hinge blades 22 fixed to the first body 11 and the second body 12 by means of screws (not shown), so that the hinge device 14 is fixed to the first and second bodies 11 and 12.

Figure 3:
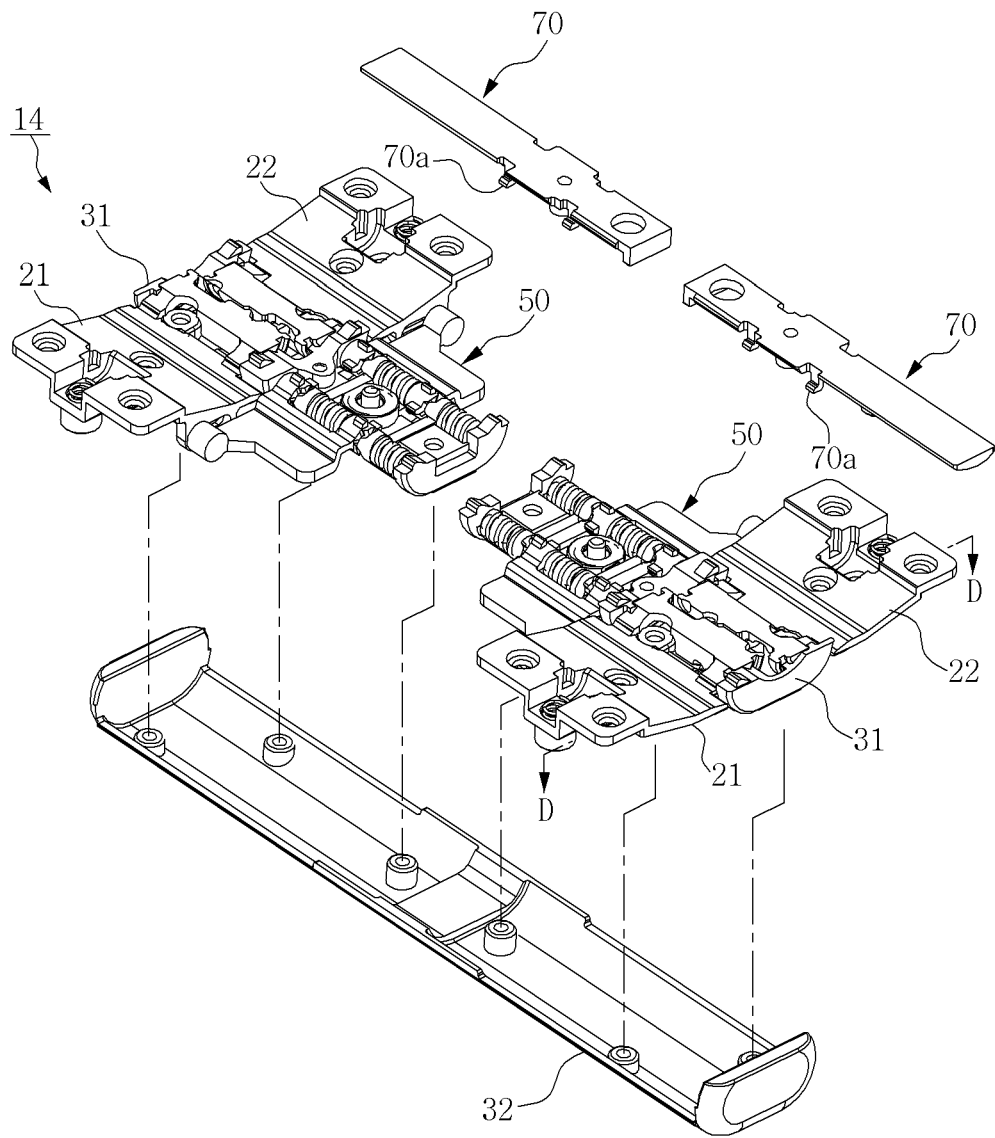
FIG. 3 is an exploded perspective view showing main components of the hinge device according to the present invention.

FIG. 3 is an exploded perspective view showing main components of the hinge device 14 according to the present invention. As shown, the hinge device 14 includes housing 31 adapted to supportingly rotate the first and second hinge blades 21 and 22 to a predetermined angle, that is, between an 'unfolding position' and a 'folding position' of the first and second bodies 11 and 12 and tension mechanism 50 adapted to perform free-stop functions between the 'unfolding position' and the 'folding position' while the first and second hinge blades 21 and 22 are rotating.

The first and second hinge blades 21 and 22, the housing 31, and the tension mechanism 50 are provided in pair so that the respective pairs have the same configuration as each other on both ends of the first and second bodies 11 and 12 connected to each other, thereby allowing the first and second bodies 11 and 12 to be stably folded and unfolded. In this case, the housing 31 and the tension mechanism 50 are fixed to a single hinge cover 32 by means of screws (not shown).

Figure 4:
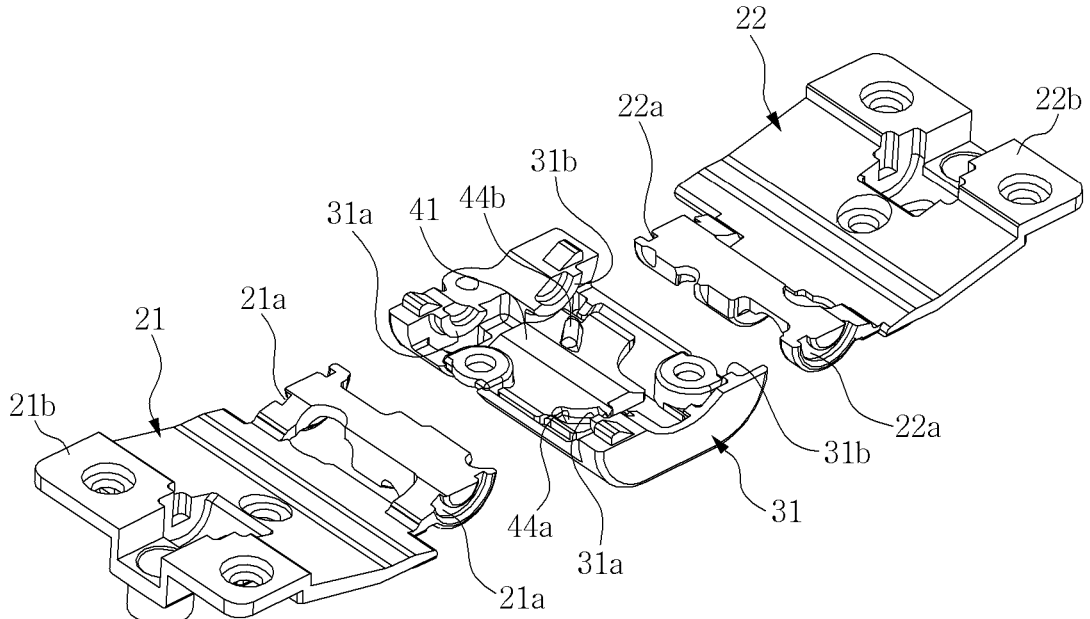
FIG. 4 is an exploded perspective view showing first and second hinge blades and a housing as a rotation-supporting structure in the hinge device according to the present invention.
Figure 5A:
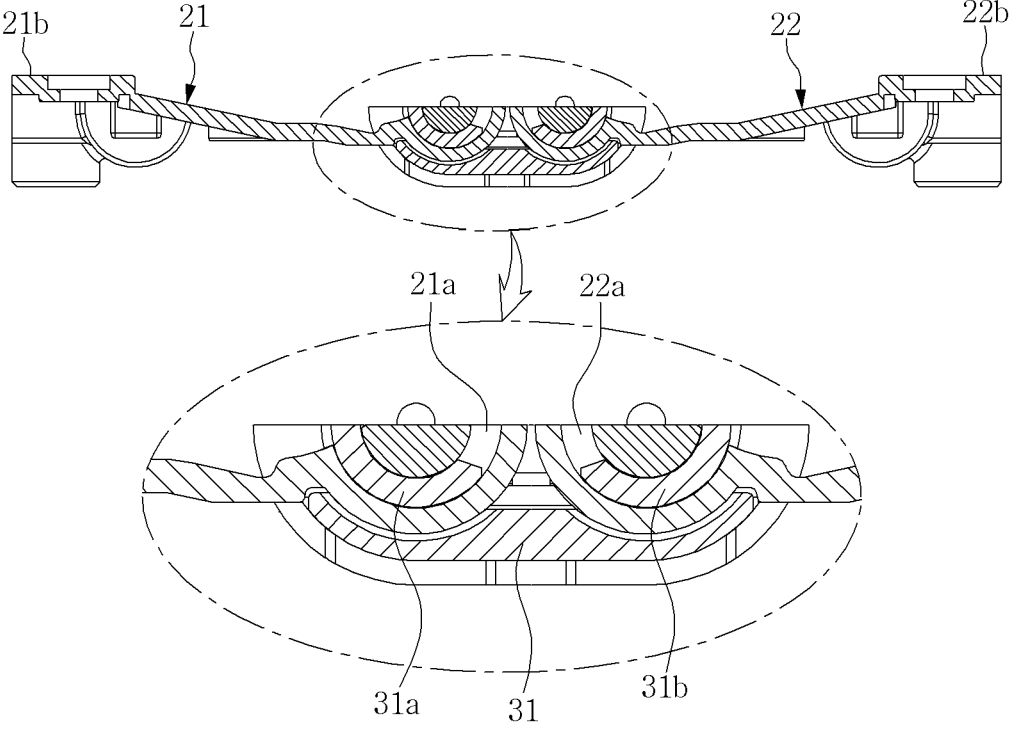
FIGS. 5a and 5b are sectional views taken along the line D-D of FIG. 3, which show the rotation-supporting structure of the first and second hinge blades of FIG. 4.
Figure 5B:
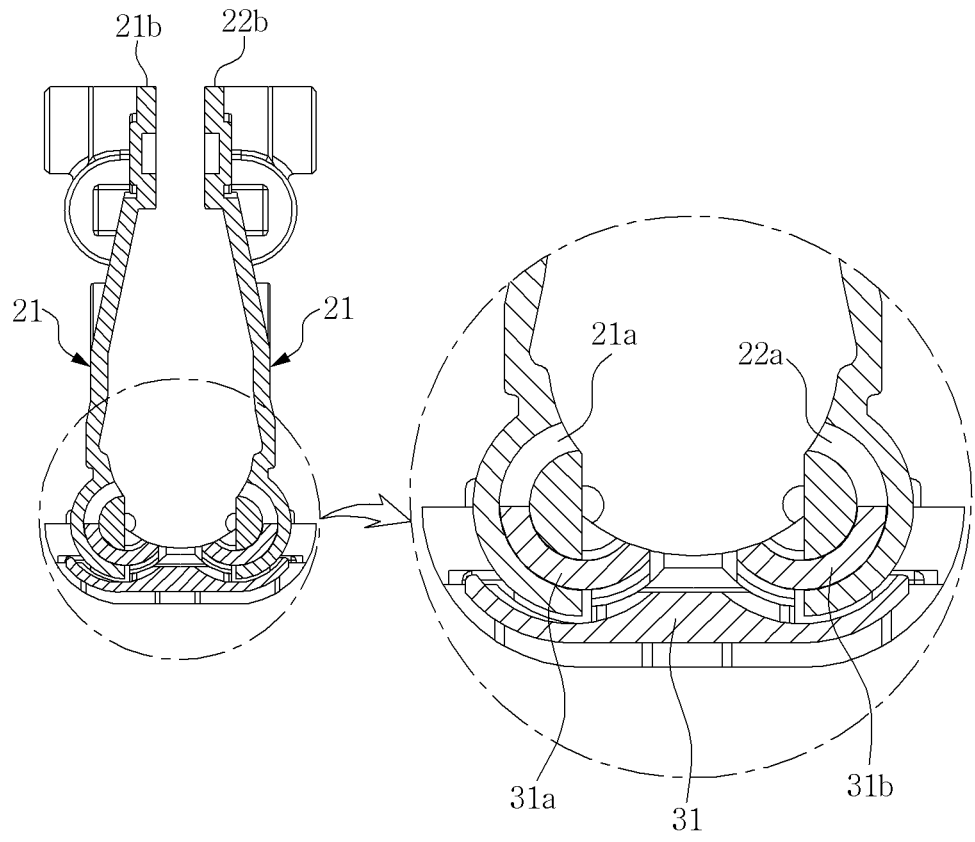

FIGS. 4, 5a and 5b show a rotation-supporting structure of the first and second hinge blades 21 and 22 of the hinge device 14 according to the present invention. FIGS. 5a and 5b are sectional views taken along the line D-D of FIG. 3, but so as to easily explain the rotation-supporting structure of the first and second hinge blades 21 and 22 as shown in FIG. 4, the sections of some components are omitted. As shown, the rotation-supporting structure of the first and second hinge blades 21 and 22 includes a pair of semi-circular protrusions 31a and a pair of semi-circular protrusions 31b spaced apart from each other by a predetermined distance on the inner wall surfaces of both sides of housing 31 and semi-circular grooves 21a and 22a to which the semi-circular protrusions 31a and 31b are fitted so that the first and second hinge blades 21 and 22 supportedly rotate.

The semi-circular grooves 21a and 22a of the first and second hinge blades 21 and 22 are formed on the opposite ends to fixing portions 21b and 22b to which the first and second bodies 11 and 12 are fixed, so that the fixing portions 21b and 22b rotate to a predetermined angle around the semi-circular grooves 21a and 22a to allow the first and second bodies 11 and 12 to supportingly rotate between the 'unfolding position' and the 'folding position'.

In this case, a distance between the semi-circular protrusions 31a and 31b is set to allow a folding space in which a predetermined curvature radius formed on a folding portion of the flexible display panel 13 at the 'folding position' is accommodated to be formed between the first and second hinge blades 21 and 22.

According to the present invention, the semi-circular grooves 21a and 22a are formed on the first and second hinge blades 21 and 22, and the semi-circular protrusions 31a and 31b are formed on the housing 31. However, of course, the semi-circular protrusions 31a and 31b may be formed on the first and second hinge blades 21 and 22, and the semi-circular grooves 21a and 22a may be formed on the housing 31.

An explanation of the rotation-supporting structure of the first and second hinge blades 21 and 22 have been given in the above, but any structure capable of supportingly rotating the bodies 11 and 12 may be coupled to interlocking means or ascending and descending plate as will be discussed later and thus applied to the present invention.

FIGS. 6, 7, 8a, 8b, and 9 show the first and second hinge blades 21 and 22, the housing 31, and the interlocking means, and in this case, a slide member 41 as the interlocking means for moving the first hinge blade 21 and the second hinge blade 22 relatively to each other is located on the housing 31.

The slide member 41 is located on the housing 31 so that it reciprocates by a predetermined distance in a directions of a rotation axial line (hereinafter, referred to as 'hinge axial line') of the first hinge blade 21 and the second hinge blade 22.

A moving structure for the slide member 41 includes a rectangular slide slot 42a formed on the housing 31 in the direction of the hinge axial line and a slide protrusion 42b protruding from the underside of the slide member 41 and thus fittedly guided along the slide slot 42a.

Further, the interlocking means includes first and second inclined guide grooves 43a and 43b formed on the undersides of the first and second hinge blades 21 and 22 and first and second inclined guide protrusions 44a and 44b protruding from top of the slide member 41. The portions of the undersides of the first and second hinge blades 21 and 22, on which the first and second inclined guide grooves 43a and 43b are formed, are curvedly formed toward the rotation directions of the first and second hinge blades 21 and 22. Further, the portions of the slide member 41, on which the first and second inclined guide protrusions 44a and 44b are formed, are curvedly formed correspondingly to the portions on which the first and second inclined guide grooves 43a and 43b are formed.

The first and second inclined guide grooves 43a and 43b are formed inclinedly along the curved surfaces of the undersides of the first and second hinge blades 21 and 22 in a direction crossing to each other with respect to the moving direction of the slide member 41. In specific, the first inclined guide groove 43a and the second inclined guide groove 43b are formed inclinedly along the curved surfaces in diagonal directions with respect to the moving directions of the slide member 41, and the respective inclined directions (diagonal directions) are not the same direction as each other, but the crossing directions to each other.

Figure 6:
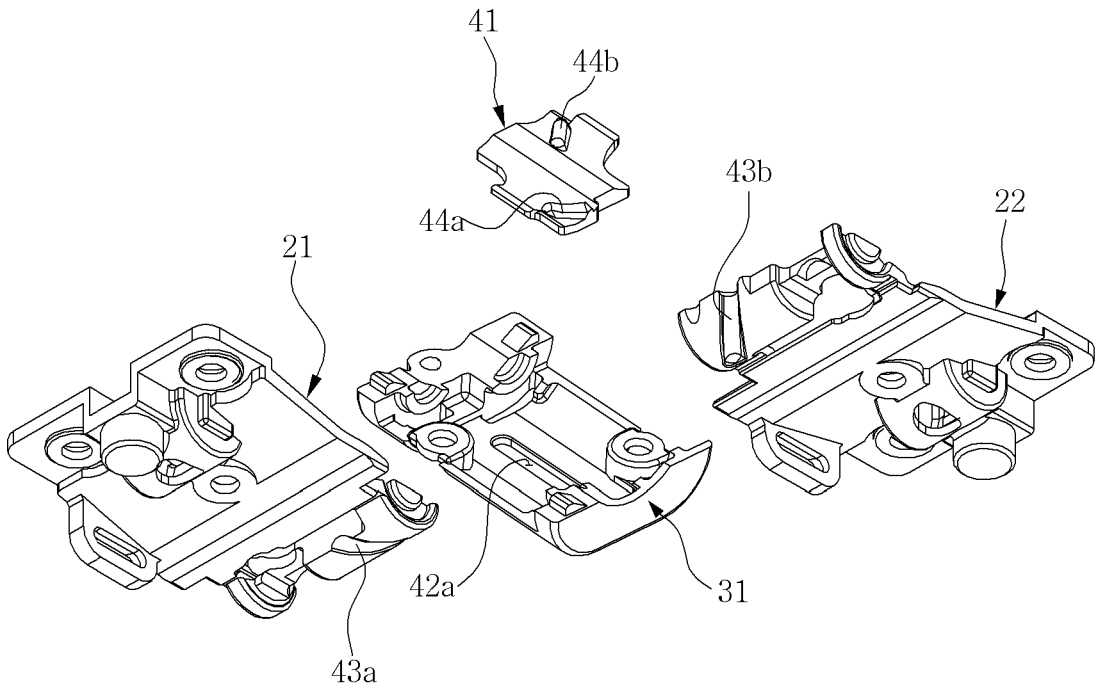
FIG. 6 is an exploded perspective view showing an interlocking structure between the first and second hinge blades and a slide member of the hinge device according to the present invention.
Figure 7:
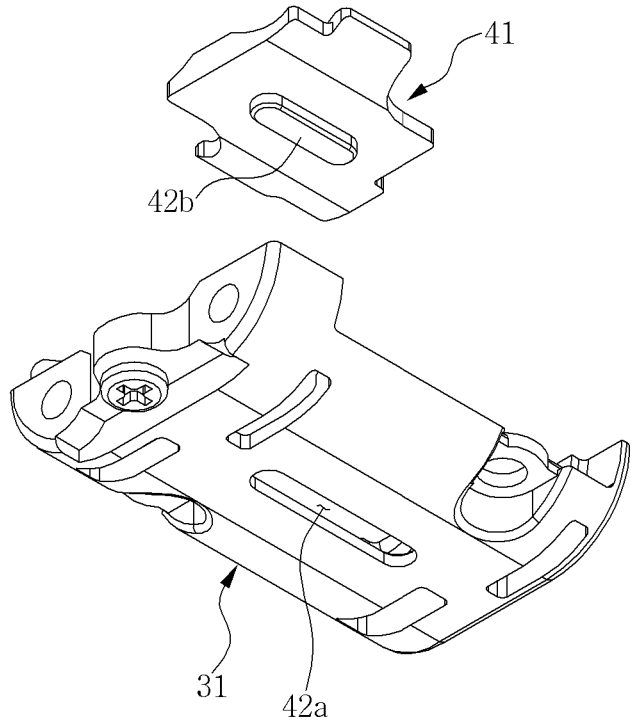
FIG. 7 is an exploded perspective view showing the undersides of the housing and the slide member of FIG. 6.
Figure 9:
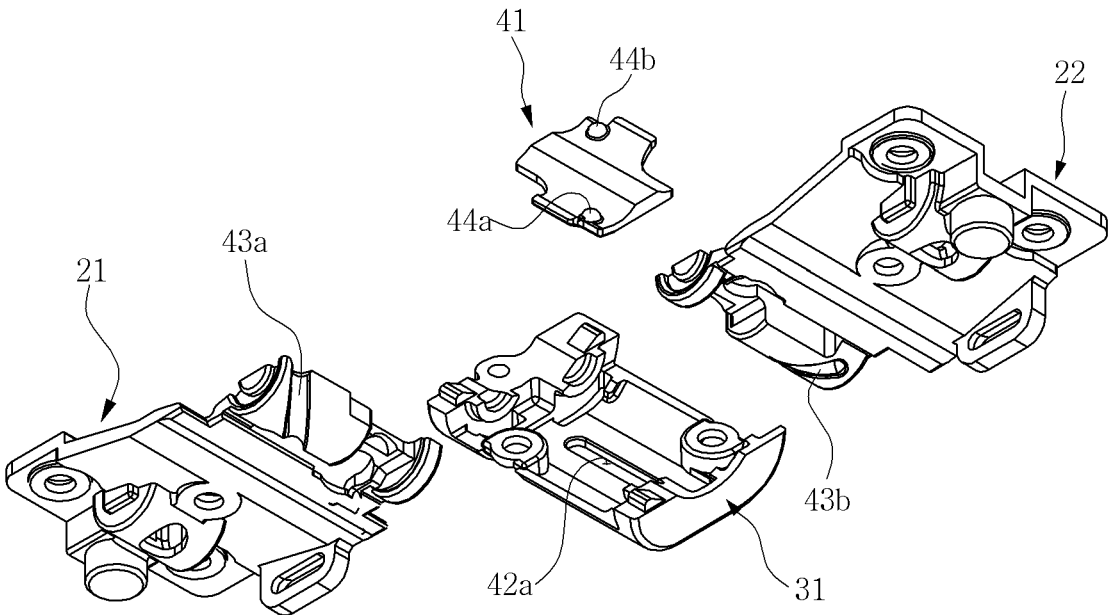
FIG. 9 is an exploded perspective view showing another interlocking structure between the first and second hinge blades and the slide member of the hinge device according to the present invention.

The first and second inclined guide protrusions 44a and 44b moving interlockingly with the first and second inclined guide grooves 43a and 43b are formed on top of the slide member 41 at the corresponding positions to the first and second inclined guide grooves 43a and 43b. The first and second inclined guide protrusions 44a and 44b have rectangular shapes as shown in FIG. 6, and further, they may have hemispherical shapes as shown in FIG. 9. As shown in FIG. 6, the first and second inclined guide protrusions 44a and 44b with the rectangular shapes become reduced in width toward tops thereof, so that when they interlock with the first and second inclined guide grooves 43a and 43b, friction forces are decreased to suppress the occurrence of vibrations and noise. Further, as shown in FIG. 9, the first and second inclined guide protrusions 44a and 44b with the hemispherical shapes become reduced in width toward tops thereof, so that the same effectiveness as above may be obtained.

The interlocking structure of the first and second hinge blades 21 and 22 allows the slide member 41, even if only one of the first and second hinge blades 21 and 22 rotates to the 'folding position' or the 'unfolding position', to linearly move by the predetermined length in the direction of the hinge axial line by means of the first and second inclined guide grooves 43a and 43b and the first and second inclined guide protrusions 44a and 44b, so that the other hinge blade moves relative to one hinge blade in the opposite direction to the rotation direction of one hinge blade and rotates to the 'folding position' or the 'unfolding position', together with one hinge blade.

Figure 10:
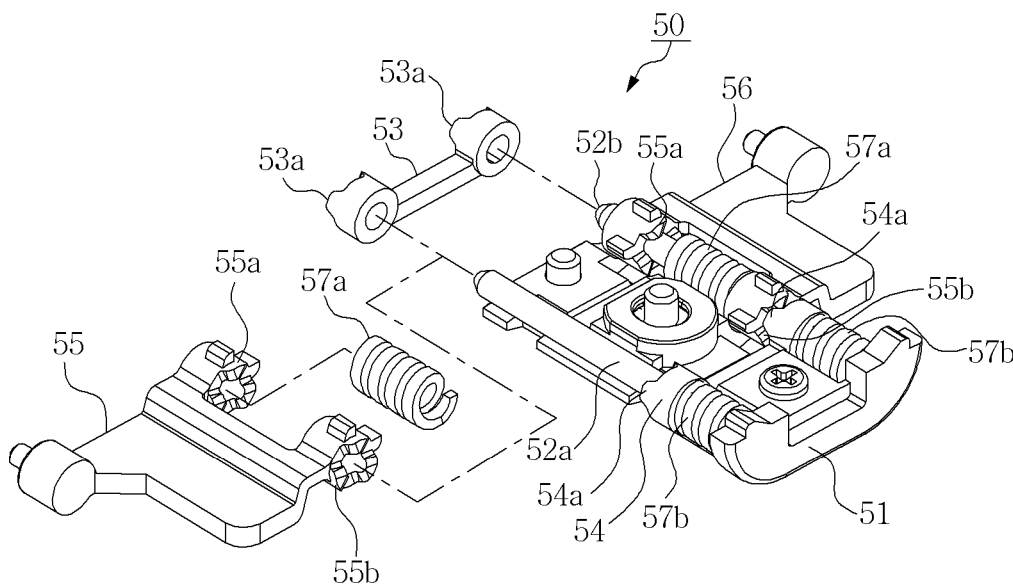
FIG. 10 is an exploded perspective view showing a tension mechanism of the hinge device according to the present invention.

FIG. 10 is a partially exploded perspective view showing the tension mechanism 50 separated from the hinge device 14 according to the present invention.

As shown, the tension mechanism 50 includes a tension fixing member 51 fixed to the hinge cover 32 (See FIG. 3) and having first and second guide shafts 52a and 52b disposed thereon in the direction of the hinge axial line.

Further, the tension mechanism 50 includes tension operating members 53 and 54 movably fitted to the first and second guide shafts 52a and 52b in axial directions and having a plurality of inclined protrusions 53a and 54a protruding in the direction of the hinge axial line therefrom in circumferential directions around the first and second guide shafts 52a and 52b.

Further, the tension mechanism 50 includes first and second tension blades 55 and 56 fitted to the first and second guide shafts 52a and 52b, rotating supportedly thereagainst, and movable to the axial directions. The first and second tension blades 55 and 56 have inclined protrusions 55a and 55b fitted to the spaces of the inclined protrusions 53a and 54a of the tension operating members 53 and 54 corresponding thereto.

Further, first springs 57a are located at spaces between the tension operating member 53 and the first tension blade 55 and the tension operating member 53 and the second tension blade 56, and second springs 57b are located at spaces between the tension operating member 54 and the tension fixing member 51. The first and second springs 57a and 57b serve to constantly apply elastic forces so that the inclined protrusions 53a and 54a of the tension operating members 53 and 54 are fitted to the inclined protrusions 55a and 55b of the first and second tension blades 55 and 56.

Figure 11:
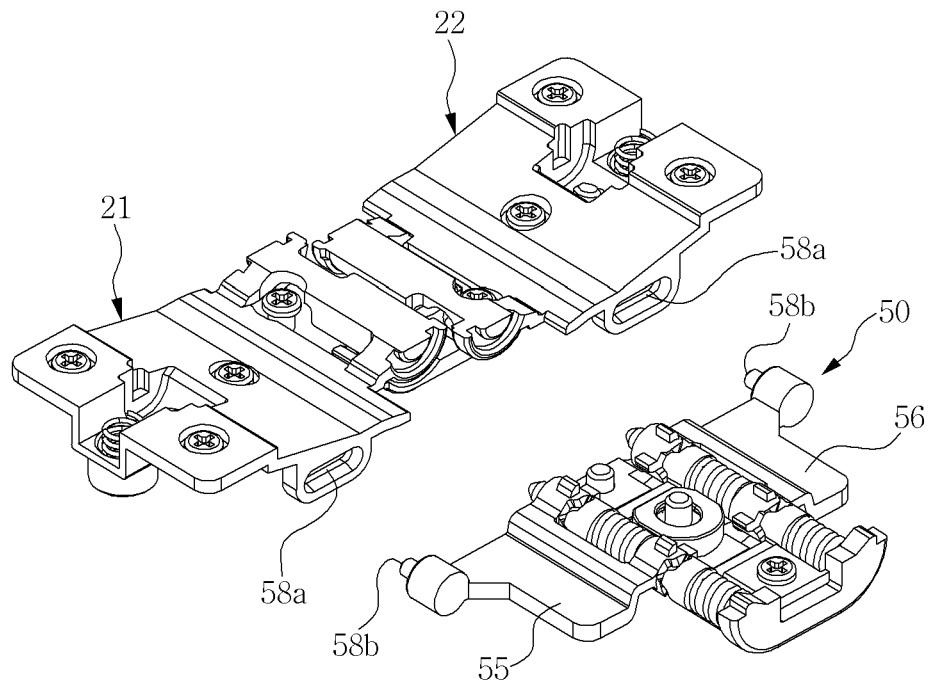
FIG. 11 is an exploded perspective view showing a connection structure between the tension mechanism and the first and second hinge blades of the hinge device according to the present invention.
Figure 12:
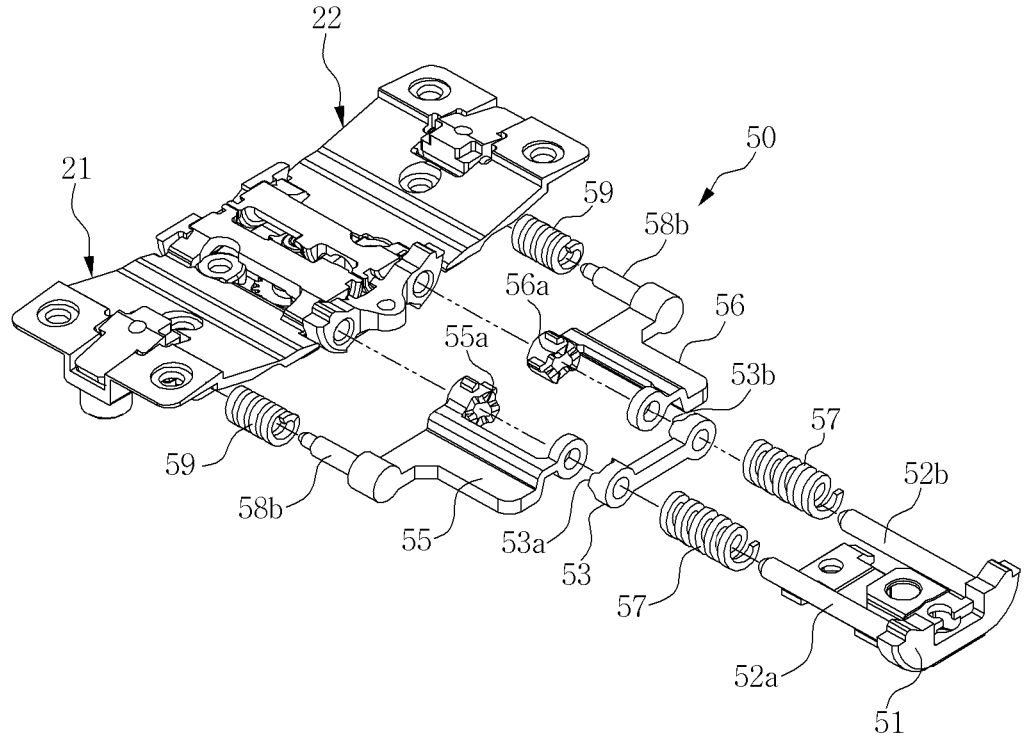
FIG. 12 is an exploded perspective view showing another example of the tension mechanism of the hinge device according to the present invention.

FIG. 11 shows a connection structure between the tension mechanism 50 and the first and second hinge blades 21 and 22, and the connection structure includes rectangular tension guide holes 58a formed on one side of the first and second hinge blades 21 and 22 and tension guide protrusions 58b protruding from the first and second tension blades 55 and 56 of the tension mechanism 50 and thus guidedly fitted to the tension guide holes 58a.

Accordingly, the first and second tension blades 55 and 56 of the tension mechanism 50 interlock with the first and second hinge blades 21 and 22 and thus rotate between the 'unfolding position' and the 'folding position', together with the first and second hinge blades 21 and 22.

The tension mechanism 50 is configured to allow the inclined protrusions 55a and 55b of the first and second tension blades 55 and 56 to be fitted or escape to or from the inclined protrusions 53a and 54a of the tension operating members 53 and 54 according to the rotations of the first and second tension blades 55 and 56 (See FIGS. 13a and 13b), so that the elastic forces of the first and second springs 57a and 57b are increased or decreased to cause the rotations of the first and second bodies 11 and 12 to be easily performed with small forces at the 'unfolding position' or the 'folding position', while the free-stop function is being performed between the 'unfolding position' and the 'folding position'.

If the rotating force is removed during the rotations of the first and second bodies 11 and 12 to the 'unfolding position' or the 'folding position' to thus stop the rotations, the free-stop function enables the first and second bodies 11 and 12 to be kept at the positions where the rotations are stopped.

Figure 13A:
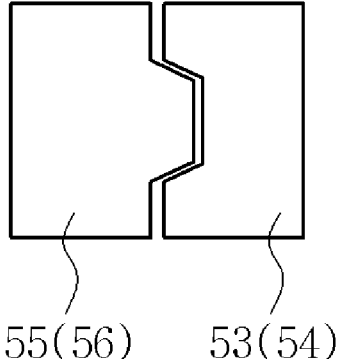
FIGS. 13a and 13b are views showing the operating states of the tension mechanism of the hinge device according to the present invention.
Figure 13B:
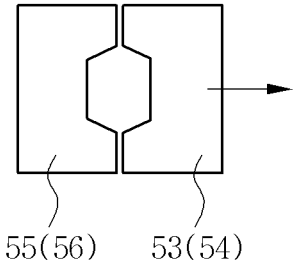
Figure 14:
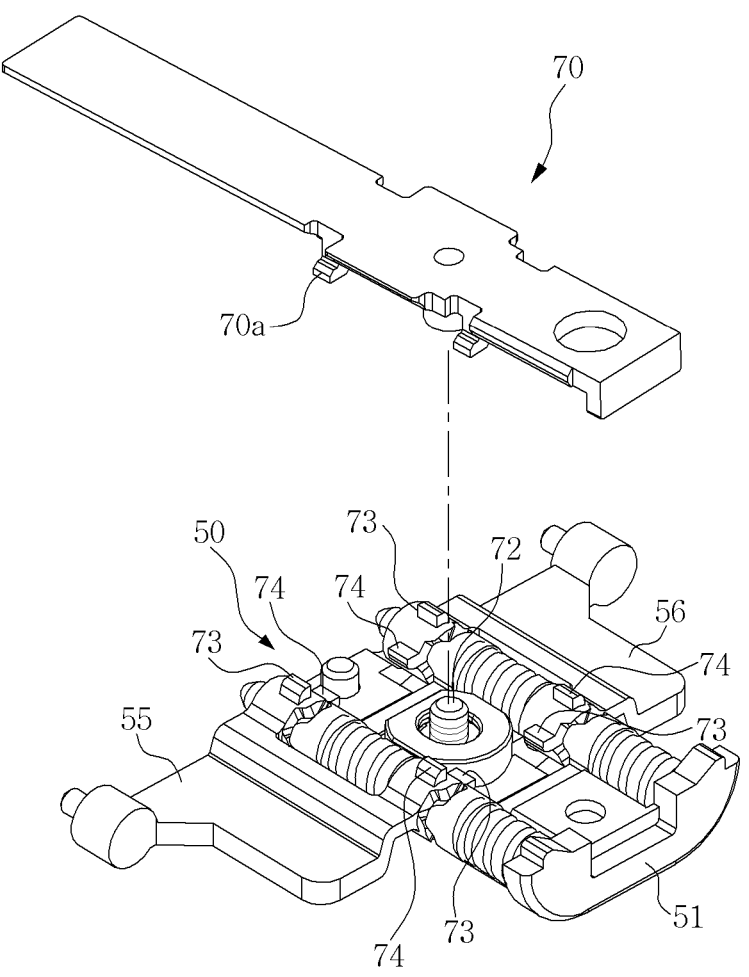
FIG. 14 is an exploded perspective view showing an installation state of an ascending and descending plate and the tension mechanism of the hinge device according to the present invention.

If the maximum curved portions of the inclined protrusions 53a and 54a of the tension operating members 53 and 54 are located in positions to face the maximum curved portions of the inclined protrusions 55a and 55b of the first and second tension blades 55 and 56 according to the rotations of the first and second tension blades 55 and 56, the first and second springs 57a and 57b are compressed so that through the compressed elastic forces, the free-stop function is performed to allow the first and second bodies 11 and 12 to be kept at the positions where the rotations are stopped (See FIGS. 13a and 13b).

FIG. 12 is an exploded perspective view showing another example of the tension mechanism of the hinge device according to the present invention. Unlike the tension mechanism as shown in FIG. 10, the tension mechanism as shown in FIG. 12 has only the springs 57 located between the tension operating member 53 and the tension fixing member 51, thereby allowing a distance between both sides of the hinge device 14 to increase. Accordingly, it is easy to locate signal wires and the hinge device is simple in configuration to improve the assemblability and durability thereof. Further, springs 59 are additionally fitted to the tension guide protrusions 58*b* of the first and second tension blades 55 and 56 to allow the first and second hinge blades 21 and 22 to elastically come into close contact with the first and second tension blades 55 and 56. As a result, the springs 59 are located on the interlocking portions most distant from the rotary axial lines of the first and second tension blades 55 and 56, thereby more increasing the elastic forces with respect to the rotary torques of the first and second tension blades 55 and 56 when compared with the elastic forces of springs 59 located sequentially to the springs 57 on the rotary axial lines. Further, the elastic forces collected to the rotary axial lines are distributed to improve the stability and durability of the tension mechanism 50.

An explanation of the tension mechanism 50 has been given above, but only if any device easily rotates the bodies 11 and 12 with a small force and performs the free-stop function, it may be coupled to the interlocking means as mentioned above or the ascending and descending plate as will be discussed later and thus applied to the present invention.

Referring back to FIGS. 2 and 3, the hinge device 14 of the present invention includes the ascending and descending plate 70 disposed elongatedly above the rotary axes of the bodies 11 and 12 in the rotary axis direction. According to the present invention, two ascending and descending plates 70 are provided, but both side ascending and descending plate 70 may be connected to each other as an integral body.

As shown in FIGS. 14, 15*a*, and 15*b*, each ascending and descending plate 70 is located on the tension fixing member 51 of the tension mechanism 50, and to do this, a screw 72 passes through the underside of the tension fixing member 51 and is thus fastened to the ascending and descending plate 70. FIGS. 15*a* and 15*b* are sectional views taken along the line B-B of FIG. 2, but so as to easily explain the installation structure of the ascending and descending plate as shown in FIG. 14 and the operating state of an elastic member, the sections of some components are omitted.

The ascending and descending plate 70 interlocks with the first and second tension blades 55 and 56 through pressurizing means as will be discussed later upon the rotations of the first and second tension blades 55 and 56 and thus moves between an ascending position (See FIG. 15*a*) at which a horizontal line is maintained at the unfolding position and a descending position (See FIG. 15*b*) at which a folding space is formed between the first hinge blade 21 and the second hinge blade 22.

The pressurizing means includes an elastic member 75 disposed between the tension fixing member 51 and the screw 72 to apply an elastic force so that the ascending and descending plate 70 is always at the descending position and first and second pressurizing protrusions 73 and 74 protruding from the first and second tension blades 55 and 56 of the tension mechanism 50, as shown in FIGS. 16*a* and 16*b*.

As shown in FIG. 15*a*, the elastic member 75 is compressed when the ascending and descending plate 70 is at the ascending position, and when the ascending and descending plate 70 is at the descending position, as shown in FIG. 15*b*, the elastic member 75 is expanded to apply the elastic force so that the ascending and descending plate 70 always moves to the descending position.

As shown, desirably, the elastic member 75 is a conical compression coil spring. The same function may be performed even with a cylindrical compression coil spring, but when the cylindrical compression coil spring is compressed, a thickness made by adding a plurality of coil diameters corresponding to the number of turns of the coil spring is provided between the tension fixing member 51 and the screw 72, so that the ascending and descending distances of the ascending and descending plate 70 are reduced, thereby failing to allow the ascending and descending plate 70 to move between the set ascending and descending positions.

Contrarily, the conical compression coil spring has a thickness corresponding to one coil diameter provided between the tension fixing member 51 and the screw 72, so that the ascending and descending distances of the ascending and descending plate 70 are sufficiently ensured, thereby making it possible to allow the ascending and descending plate 70 to move between the set ascending and descending positions.

FIGS. 16*a* and 16*b* are sectional views taken along the line C-C of FIG. 2, but so as to easily explain the operating state of the ascending and descending plate 70 through the first and second pressurizing protrusions as the pressurizing means as shown in FIG. 14, the sections of some components are omitted. Desirably, the first and second pressurizing protrusions 73 and 74 are formed in circumferential directions on the rotating portions around the first and second guide shafts 52*a* and 52*b*. As shown in FIGS. 16*a* and 16*b*, the first and second pressurizing protrusions 73 and 74 are formed on the first and second hinge blades 55 and 56.

As shown in FIG. 16*a*, the first pressurizing protrusions 73 serve to pressurize one side 70*a* of the ascending and descending plate 70, when the first and second tension blades 55 and 56 rotate to the unfolding position, to thus keep the ascending and descending plate 70 at the ascending position, and as shown in FIG. 16*b*, the second pressurizing protrusions 74 serve to pressurize one side 70*a* of the ascending and descending plate 70, when the first and second tension blades 55 and 56 rotate to the folding position, to thus keep the ascending and descending plate 70 at the descending position. The pressurizing means of the ascending and descending plate 70 may include only the first and second pressurizing protrusions 73 and 74, without having the elastic member 75.

Now, an explanation of the operations of the hinge device according to the present invention will be given.

If the first and second bodies 11 and 12 move between the unfolding position and the folding position, as shown in FIGS. 5*a* and 5*b*, the semi-circular grooves 21*a* and 22*a* of the first and second hinge blades 21 and 22 fixed to the first and second bodies 11 and 12 are guided by the semi-circular protrusions 31*a* and 31*b* of the housing 31 and thus supportedly rotate, so that the operations for moving the first and second bodies 11 and 12 between the 'unfolding position' and the 'folding position' may be gently performed.

Further, even though only one of the first body 11 and the second body 12 rotates, the other body moves relatively to one body and thus rotates together with the rotating body through the interlocking means.

In specific, as shown in FIG. 8*a*, if only the first hinge blade 21 rotates to the 'folding position' to allow the first inclined guide groove 43*a* of the first hinge blade 21 to rotate around the hinge axial line of the first hinge blade 21 and thus move to a direction of an arrow 'a1' from an imaginary line, the slide member 41 linearly moves to a direction of an arrow 'a2' by means of the first inclined guide protrusion 44*a* guided by the first inclined guide groove 43*a*, so that as the second inclined guide groove 43*b* of the second hinge blade 22 is guided by the second inclined guide protrusion 44*b* and moves to a direction of an arrow 'a3' from an imaginary line, the second hinge blade 22 moves to the 'folding position', together with the first hinge blade 21.

Contrarily, even if the second inclined guide groove 43*b* of the second hinge blade 22 moves to the direction of the arrow 'a3', the first inclined guide groove 43*a* of the first hinge blade 21 moves to the direction of the arrow 'a1' by means of the first and second inclined guide protrusions 44*a* and 44*b* of the slide member 41, and accordingly, the first hinge blade 21 does not move, together with the second hinge blade 22.

Figure 8A:
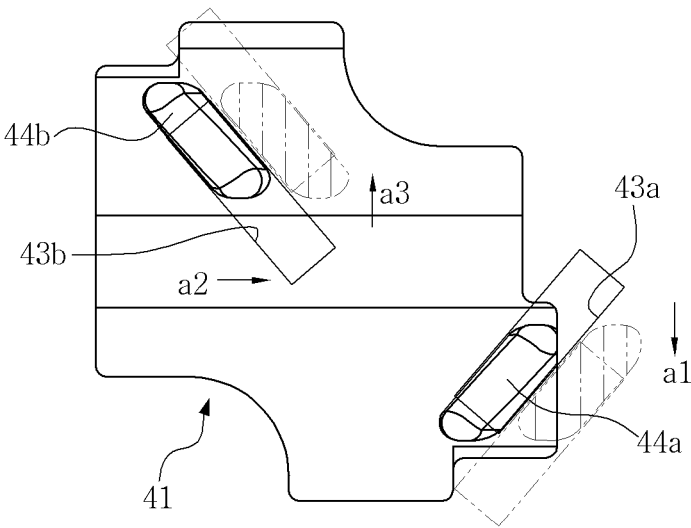
FIGS. 8a and 8b are views showing an operating state of the slide member of the hinge device according to the present invention.
Figure 8B:
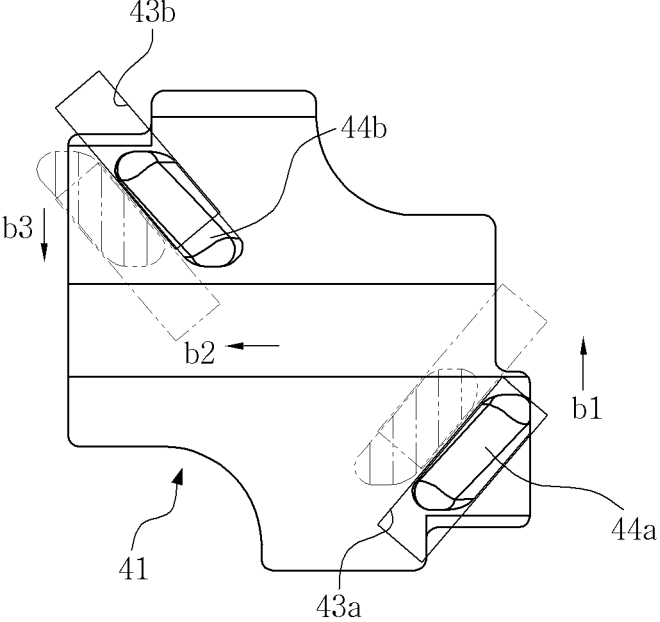

In the same manner as above, as shown in FIG. 8*b*, if only the first hinge blade 21 rotates to the 'unfolding position' to allow the first inclined guide groove 43*a* of the first hinge blade 21 to move to a direction of an arrow 'b1' from an imaginary line, the slide member 41 moves to a direction of an arrow 'b2' by means of the first inclined guide protrusion 44*a* guided by the first inclined guide groove 43*a*, so that as the second inclined guide groove 43*b* of the second hinge blade 22 is guided by the second inclined guide protrusion 44*b* and moves to a direction of an arrow 'b3' from an imaginary line, the second hinge blade 22 moves to the 'unfolding position', together with the first hinge blade 21.

Contrarily, even if the second inclined guide groove 43*b* of the second hinge blade 22 moves to the direction of the arrow 'b3', the first inclined guide groove 43*a* of the first hinge blade 21 moves to the direction of the arrow 'b1' by means of the first and second inclined guide protrusions 44*a* and 44*b* of the slide member 41, and accordingly, the first hinge blade 21 does not move, together with the second hinge blade 22.

In FIGS. 8*a* and 8*b*, the first and second inclined guide grooves 43*a* and 43*b* interlock with the slide member 41 with the first and second inclined guide protrusions 44*a* and 44*b* linearly moving in the direction of the arrow a2 or b2 and thus linearly move in the directions of the arrow a1 or b1 and the arrow a3 or b3 on the plane, but the portions where the first and second inclined guide grooves 43*a* and 43*b* are formed are curvedly formed in the rotating directions, so that the first and second hinge blades 21 and 22 having the first and second inclined guide grooves 43*a* and 43*b* rotate to the 'folding position' or the 'unfolding position'.

The hinge device 14 of the present invention is configured to allow the free-stop function to be performed by the tension mechanism 50 when the rotating positions of the first and second bodies 11 and 12 are between the 'unfolding position' and the 'folding position'.

As shown in FIGS. 10 and 11, each tension mechanism 50 is configured to allow the tension guide protrusions 58*b* of the first and second tension blades 55 and 56 to be guided along the tension guide holes 58*a* of the first and second hinge blades 21 and 22, so that upon the rotations of the first and second hinge blades 21 and 22, the first and second tension blades 55 and 56 rotate interlockingly with the first and second hinge blades 21 and 22.

When the first and second hinge blades 21 and 22 are at the 'folding position' or the 'unfolding position', accordingly, the inclined protrusions 55*a* and 55*b* of the first and second tension blades 55 and 56 are fitted between the inclined protrusions 53*a* and 54*a* of the tension operating members 53 and 54 (See FIG. 13*a*), and the first and second springs 57*a* and 57*b* are expanded. As a result, the elastic forces of the first and second springs 57*a* and 57*b* for pressurizing the first and second hinge blades 21 and 22 toward the direction of the hinge axial line are reduced to allow the first and second hinge blades 21 and 22 to easily rotate with a small force.

When the first and second hinge blades 21 and 22 are between the 'folding position' and the 'unfolding position', further, the inclined protrusions 55*a* and 55*b* of the first and second tension blades 55 and 56 escape from the inclined protrusions 53*a* and 54*a* of the tension operating members 53 and 54 by the rotations of the first and second tension blades 55 and 56 to allow the tension operating members 53 and 54 to pressurizedly move in the direction of the hinge axial line (See FIG. 13*b*)

Accordingly, the tension operating members 53 and 54 move along the first and second guide shafts 52*a* and 52*b* to allow the first and second springs 57*a* and 57*b* to be compressed. As a result, the elastic forces of the first and second springs 57*a* and 57*b* for pressurizing the tension operating members 53 and 54 toward the first and second tension blades 55 and 56 are increased, and through the compressed elastic forces, accordingly, the free-stop function is performed to allow the first and second bodies 11 and 12 to be kept at the positions where the rotations are stopped.

According to the present invention, further, the hinge device 14 is configured to allow the ascending and descending plate 70, when the first and second hinge blades 21 and 22 are between the folding position and the unfolding position, to rotate interlockingly with the first and second hinge blades 21 and 22, so that the folding portion of the flexible display panel 13 is kept to a horizontal level at the unfolding position of the first and second bodies 11 and 12, and a folding space, in which a predetermined curvature radius formed on the folding portion of the display panel 12 is accommodated, is formed at the folding position of the first and second bodies 11 and 12.

Figure 15A:
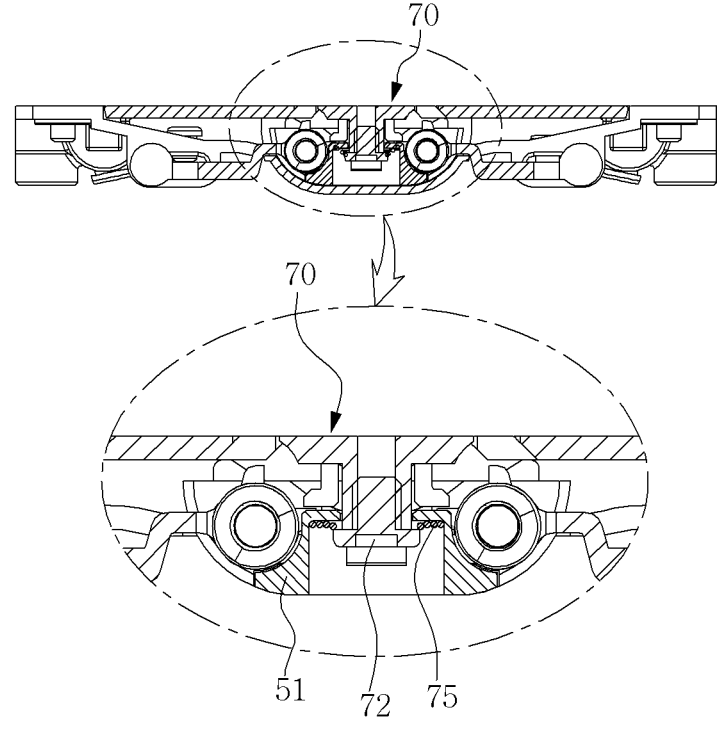
FIGS. 15a and 15b are sectional views taken along the line B-B of FIG. 2, which show a configuration of the ascending and descending plate of FIG. 14 and an operating state of the ascending and descending plate through an elastic member as pressurizing means.
Figure 15B:
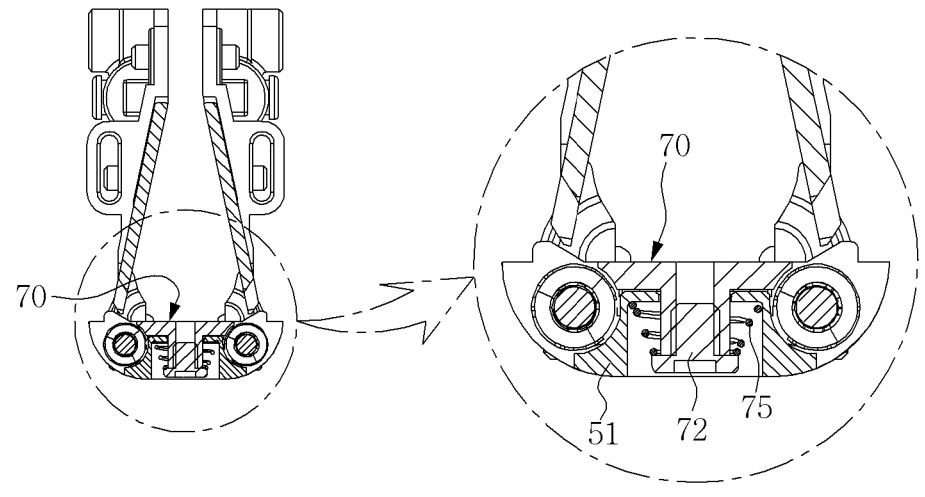
Figure 16A:
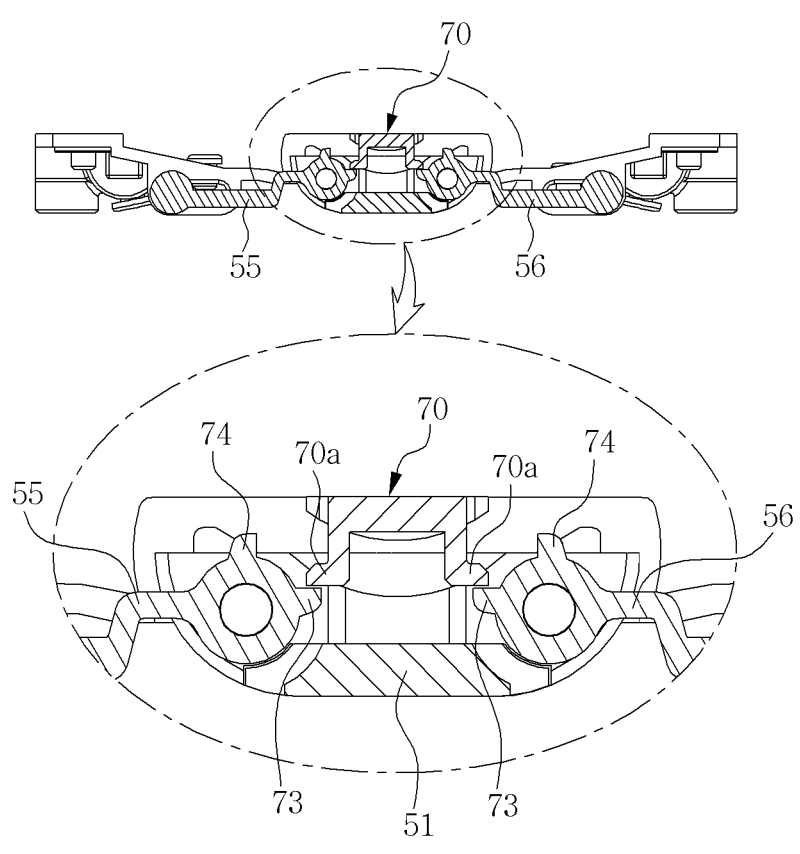
FIGS. 16a and 16b are sectional views taken along the line C-C of FIG. 2, which show an operating state of the ascending and descending plate through first and second pressurizing protrusions as the pressurizing means of FIG. 14.
Figure 16B:
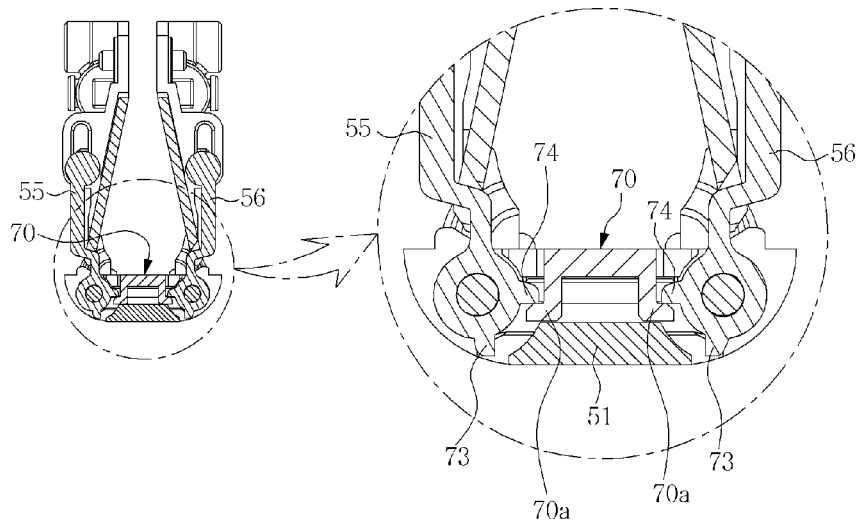

In specific, as shown in FIG. 15*b*, the ascending and descending plate 70 is at the descending position by means of the elastic force of the elastic member 75, and as shown in FIG. 16*b*, the first pressurizing protrusions 74 of the first and second tension blades 55 and 56 of the tension mechanism 50 pressurize one side 70*a* of the ascending and descending plate 70 to allow the ascending and descending plate 70 to be kept at the descending position.

If the first and second bodies 11 and 12 rotate to the unfolding position from the folding position, as shown in FIG. 15*a*, the first and second hinge blades 21 and 22 fixed to the first and second bodies 11 and 12 rotate together with the first and second bodies 11 and 12. In this case, as shown in FIG. 16*a*, the second pressurizing protrusions 74 are separated from the ascending and descending plate 70 by means of the rotations of the first and second tension blades 55 and 56, and the first pressurizing protrusions 73 pressurize one side 70*a* of the ascending and descending plate 70 to allow the ascending and descending plate 70 to move from the descending position to the ascending position, so that as shown in FIG. 15*a*, the elastic member 75 is compressed.

If the ascending and descending plate 70 moves to the ascending position, it is ascended to keep the folding portion of the flexible display panel 13 to the horizontal level.

Next, if the first and second bodies 11 and 12 rotate to the folding position from the unfolding position, as shown in FIG. 15*b*, the first and second hinge blades 21 and 22 fixed to the first and second bodies 11 and 12 rotate together with the first and second bodies 11 and 12. In this case, as shown in FIG. 16*b*, the first pressurizing protrusions 73 are separated from the ascending and descending plate 70, and the second pressurizing protrusions 74 pressurize one side 70*a* of the ascending and descending plate 70 to allow the ascending and descending plate 70 to move from the ascending position to the descending position, so that as shown in FIG. 15*b*, the elastic force of the elastic member 75 compressed helps the ascending and descending plate 70 descended.

If the ascending and descending plate 70 moves to the descending position, the space between the first and second hinge blades 21 and 22 is extendedly ensured, so that the folding space in which the predetermined curvature radius formed on the folding portion of the flexible display panel 13 is accommodated can be formed. According to the hinge device of the present invention, the display panel attached to the first and second bodies 11 and 12 has the predetermined curvature radius on the folding portion at the folding position, while the portions excepting the folding portion are being folded parallel to each other.

According to the hinge device 14 of the present invention, the folding portion of the flexible display panel 13 is kept to the horizontal level at the unfolding position of the first and second bodies 11 and 12, and the folding space in which the predetermined curvature radius formed on the folding portion of the flexible display panel 13 is accommodated is formed at the folding position of the first and second bodies 11 and 12.

The ascending and descending plate as mentioned above may be coupled to various rotation-supporting structures, interlocking means, or tension mechanism, excepting the rotation-supporting structure, the interlocking means, or the tension mechanism that have been suggested in the foregoing embodiment.

The hinge device of the present invention may be applied to all kinds of devices having hinge structures such as laptop computers, in addition to the portable terminals such as smartphones.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention. Persons skilled in the relevant art can appreciate that many modifications and variations are possible in light of the above teachings. It is therefore intended that the scope of the invention be limited not by this detailed description, but rather by the claims appended hereto.

The invention claimed is:

1. A hinge device for a portable terminal with a foldable structure, comprising:

a housing positioned between one end of a first body and one end of a second body;

a first hinge blade and a second hinge blade fixed to the first body and the second body, respectively, and supported by the housing to rotate at a predetermined angle between an unfolded position in which the first body and the second body are placed on the same horizontal line and a folded position in which the first body and the second body face each other and come into contact with each other; and a slide member for interlocking the first hinge blade and the second hinge blade so that the first hinge blade and the second hinge blade move relative to each other, wherein the first hinge blade includes a first inclined guide groove disposed on an underside of the first hinge blade, and the second hinge blade includes a second inclined guide groove disposed on an underside of the second hinge blade, wherein the slide member has a first inclined guide protrusion and a second inclined guide protrusion disposed on an upper surface of the slide member, the slide member being disposed in the housing and reciprocating by a predetermined distance along a hinge axis, wherein the first and second inclined guide protrusions are slidably received in and movable along the respective first and second inclined guide grooves, and wherein the housing includes an elongated rectangular slide slot extending along the hinge axis, and the slide member includes a slide protrusion fitted in the elongated rectangular slide slot to guide reciprocation of the slide member along the hinge axis.

2. The hinge device according to claim 1, wherein the first inclined guide groove and the second inclined guide groove are inclined in mutually crossing directions with respect to a moving direction of the slide member.

3. The hinge device according to claim 1, wherein portions on which the first inclined guide groove and the second inclined guide groove are disposed are curved toward respective rotation directions of the first and second hinge blades.

4. The hinge device according to claim 1, wherein the first inclined guide protrusion and the second inclined guide protrusion taper toward respective distal ends.

5. The hinge device according to claim 1, wherein the first inclined guide protrusion and the second inclined guide protrusion are rectangular and elongated along lengthwise directions of the first inclined guide groove and the second inclined guide groove.

6. The hinge device according to claim 1, wherein the first inclined guide protrusion and the second inclined guide protrusion are hemispherical.

7. The hinge device according to claim 1, wherein a pair of semi-circular protrusions are disposed on opposite inner wall surfaces of the housing, and semi-circular grooves are disposed on the first hinge blade and the second hinge blade, respectively, rotatably fit onto the semi-circular protrusions.

8. The hinge device according to claim 7, wherein the pair of semi-circular protrusions are spaced apart from each other by a predetermined distance such that, at the folded position, a folding portion of a flexible display panel having a predetermined curvature radius is accommodated between the semi-circular protrusions.

9. The hinge device according to claim 1, further comprising a tension mechanism comprising a tension fixing member having a first guide shaft and a second guide shaft disposed thereon along the hinge axis, a first tension blade and a second tension blade rotatably supported on and axially movable along the respective guide shafts, tension operating members movably fitted to the first guide shaft and the second guide shaft, and first springs applying elastic forces to the tension operating members.

10. The hinge device according to claim 9, wherein a plurality of inclined protrusions are disposed on the tension operating members in circumferential directions around the first guide shaft and the second guide shaft, and a plurality of complementary inclined protrusions, engageable with the plurality of inclined protrusions of the tension operating members, are disposed on the first tension blade and the second tension blade.

11. The hinge device according to claim 9, wherein the tension mechanism includes tension guide protrusions protruding from the first tension blade and the second tension blade, respectively, and the tension guide protrusions are inserted into and guided in tension guide holes disposed on one side of the first hinge blade and the second hinge blade.

12. The hinge device according to claim 11, wherein the tension guide holes are rectangular.

13. The hinge device according to claim 9, further comprising second springs disposed at interlocking portions between the first and the second hinge blades and the respective first and the second tension blades, the second springs being located at portions farthest from the rotation axis of the first tension blade and the second tension blade.

14. The hinge device according to claim 1, further comprising an ascending and descending plate disposed in the housing and positioned in a folding space, the ascending and descending plate being interlocked by pressurization in response to rotations of the first hinge blade and the second hinge blade and thereby moving between an ascending position spaced from the housing to connect the first body and the second body on a horizontal line at the unfolded position and a descending position adjacent to the housing to form the folding space between the first hinge blade and the second hinge blade.

15. The hinge device according to claim 14, wherein the ascending and descending plate interlocks through a pressurizing mechanism, and the pressurizing mechanism has a first pressurizing protrusion and a second pressurizing protrusion adapted to pressurize the ascending and descending plate so as to move the ascending and descending plate to the ascending position and the descending position.

16. The hinge device according to claim 15, wherein the first pressurizing protrusion and the second pressurizing protrusion are disposed on rotating portions around a first guide shaft and a second guide shaft.

17. The hinge device according to claim 15, wherein the pressurizing mechanism further comprises an elastic member adapted to apply an elastic force to the ascending and descending plate so that the ascending and descending plate is at the descending position.

18. The hinge device according to claim 17, wherein the elastic member is a conical compression coil spring.

*  *  *  *  *